Nov. 24, 1964     P. COLIN ETAL     3,158,649
PROCESS FOR EXTRACTING ORGANIC ACIDS PRODUCED BY FERMENTATION
Filed June 13, 1962
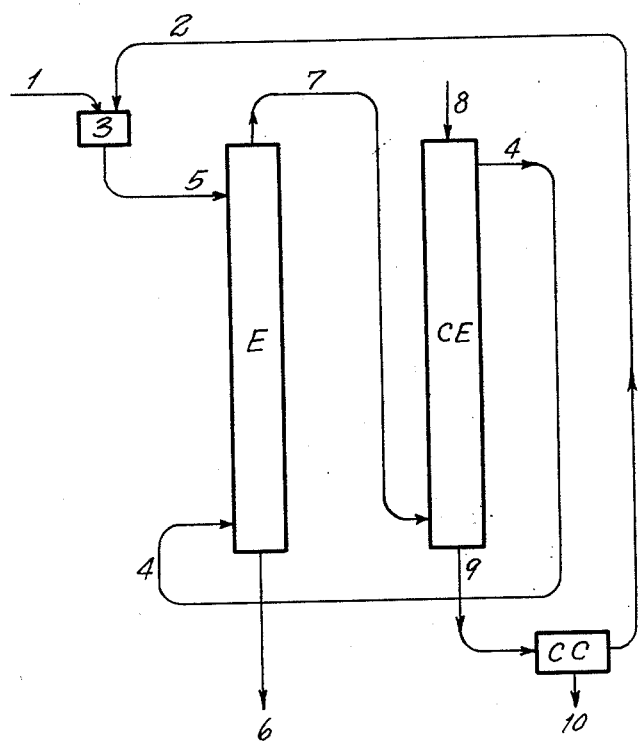
INVENTORS
PIERRE COLIN
BY MAURICE MENTION
Ward, Neal, Haselton, Orme + McElhannon
ATTORNEYS

United States Patent Office 3,158,649
Patented Nov. 24, 1964

3,158,649
PROCESS FOR EXTRACTING ORGANIC ACIDS PRODUCED BY FERMENTATION
Pierre Colin and Maurice Mention, Melle, France, assignors to Les Usines de Melle (Societe Anonyme), Melle, France, a corporation of France
Filed June 13, 1962, Ser. No. 202,253
Claims priority, application France, June 20, 1961, 865,493
5 Claims. (Cl. 260—527)

This invention is concerned with the separation of organic acids, more especially citric acid and itaconic acid produced by fermentation, from solutions containing them.

Solvent extraction of organic acids, especially those produced by fermentation procedures, such as citric and itaconic acids, is a difficult operation because there has not yet been an extraction solvent or solvent mixture available combining high selectivity with a suitable distribution coefficient. Extraction mediums heretofore available having a distribution coefficient high enough to permit extraction of large amounts of acids without the use of a large volume of solvent have also extracted large amounts of other materials so that it has proved difficult to obtain the desired acid from the extraction solvent in high yield and purity. On the other hand, extraction solvents having the proper selectivity so that only minor amounts of extraneous products are extracted along with the desired acid have such a low distribution coefficient that undesirably large volumes of extraction solvent must be employed.

An object of the invention is to separate citric and itaconic acids produced by fermentation, from aqueous mixtures containing them by a unique and highly efficient extraction procedure.

Another object of the invention is to provide a method by which those acids can be obtained economically in high yield and in a high state of purity.

These and other objects will be apparent from the following description of the novel features of this invention.

We have now found in accordance with our invention that a mixture of tri-n-butyl phosphate with a minor proportion of a liquid diluent having a specific gravity lower than that of tri-n-butyl phosphate constitutes a solvent medium having the desired properties, namely, high distribution coefficient of acid between the extract phase and the residual aqueous phase and high selectivity towards the acids to be extracted. The specific gravity of the liquid diluent is preferably from about 0.6 to about 0.9. The diluent should be substantially insoluble in water and chemically inert towards the acids to be extracted under the extraction conditions. It will have a low volatility, i.e., it will begin to distill off under standard atmospheric conditions at a temperature of at least about 80° C.

Although many diluents having the above characteristics may be employed, the most suitable diluents are hydrocarbons or hydrocarbon mixtures such as white spirit or kerosene, halogenated hydrocarbons such as n-butyl chloride, ethers such as n-butyl ether, esters more particularly organic carboxylic acid esters such as n-butyl, isobutyl, secondary butyl, amyl or isoamyl formates, acetates or butyrates, ketones such as methyl isobutyl ketone, alcohols such as octyl alcohols, more particularly 2-ethyl hexanol. The diluents may be used alone or in mixtures containing two or more diluents.

Generally it is preferred to employ from about 5 to about 30 volumes of diluent per 100 volumes of tri-n-butyl phosphate i.e. from about 5% to about 30% by volume with respect to the tri-n-butyl phosphate.

The invention is preferably carried out in the following manner. The solution of acid to be extracted is contacted preferably in a continuous and counter-current manner with a solvent of the class described above to give an extract consisting of a solution of the acid in the extraction solvent. The extract is then washed with water. This operation is termed hereinafter "counter-extraction" and is preferably carried out employing continuous and counter-current techniques. The water becomes laden with acid from the original solvent extract and there is obtained a second aqueous, purified solution of the acid which constitutes the final aqueous extract. The residual extraction solvent, i.e. the original extract freed from the acid, may be recycled. The desired acid is obtained from the final aqueous extract in accordance with standard procedures, for example, concentration and crystallization.

The distribution coefficient is defined as the ratio of the acid in the extract phase to the acid in the aqueous phase expressed in grams per liter after contact of the extraction solvent with the solution to be extracted. The distribution coefficient with a solvent or solvent system in accordance with this invention varies widely according to the acid content in the aqueous phase and the temperature. This phenomenon is much more pronounced than with solvents previously used for extraction. The variations in the distribution coefficient can, therefore, be controlled and this permits complete control of the extraction operation.

Table I below illustrates the variation of distribution coefficients in experiments using a mixture of nine volumes of tri-n-butyl phosphate and one volume of n-butyl ether to extract a pure aqueous solution of citric acid. The acid concentration is expressed in grams per liter of citric acid monohydrate. It will be noted that the distribution coefficient varies with both concentration and temperature.

TABLE I

| Acidity of the aqueous layer (g./l.) | Temperature (° C.) | | | | | | |
|---|---|---|---|---|---|---|---|
| | 14 | 25 | 32 | 38 | 45 | 52 | 75 |
| 10 | 2.0 | 1.3 | 1.0 | 0.9 | 0.7 | 0.6 | 0.40 |
| 20 | 1.5 | 1.2 | 0.95 | 0.8 | 0.65 | 0.55 | 0.39 |
| 30 | 1.3 | 1.08 | 0.9 | 0.78 | 0.62 | 0.50 | 0.38 |
| 40 | 1.2 | 0.95 | 0.82 | 0.70 | 0.61 | 0.49 | 0.36 |
| 50 | 1.08 | 0.90 | 0.78 | 0.66 | 0.60 | 0.48 | 0.34 |
| 100 | 0.73 | 0.65 | 0.57 | 0.50 | 0.47 | 0.38 | 0.30 |
| 150 | 0.62 | 0.58 | 0.47 | 0.42 | 0.37 | 0.33 | 0.28 |
| 200 | 0.52 | 0.46 | 0.42 | 0.39 | 0.36 | 0.31 | 0.26 |
| 250 | 0.48 | 0.42 | 0.38 | 0.36 | 0.34 | 0.30 | 0.25 |

A study of Table I shows that to obtain a more concentrated final aqueous extract, it is advisable to carry out the counter-extraction at a temperature higher than that of the extraction step. In accordance with this invention, the first extraction is preferably carried out at a temperature of from about 10 to about 30° C. and the counter-extraction at a temperature of from about 70 to about 95° C.

The process of this invention may be applied to itaconic acid. Table II illustrates the variation of distribution coefficient with temperature and concentration using a pure aqueous itaconic acid solution and an extraction medium comprising nine volumes of tri-n-butyl phosphate and one volume of white spirit.

TABLE II

| Acidity of the aqueous layer (g./l.) | Temperature (° C.) | | | | |
|---|---|---|---|---|---|
| | 14 | 25 | 30 | 40 | 80 |
| 5 | 11 | 9.0 | 7.0 | 5.0 | 2.1 |
| 10 | 7 | 6.0 | 5.2 | 4.0 | 2.0 |
| 20 | 4.55 | 4.25 | 3.9 | 3.25 | 1.9 |
| 30 | 3.85 | 3.4 | 3.1 | 2.8 | 1.8 |
| 40 | 3.1 | 2.8 | 2.7 | 2.5 | 1.7 |
| 50 | 2.7 | 2.5 | 2.4 | 2.2 | 1.6 |
| 80 | 1.97 | 1.88 | 1.82 | 1.75 | 1.30 |

In the production of organic acids by industrial fermentation the desired acid is, at least in part, in combined forms, usually as salts. Therefore, before carrying out the extraction it is advisable to liberate the acid from fermentation, for example, by the addition of strong inorganic acid to the solution to be extracted. In the case of citric acid produced by fermentation of molasses by means of a suitable organism, it is preferred to adjust the pH of the solution to 1.6 to 1.8 by adding sulfuric acid or other strong acid after removal of the mycelium and, if necessary, oxalic acid.

Industrial solutions of organic acids, for example citric acid solutions produced by fermenting molasses, contain as impurities amino acids and various other organic acids such as pyrrolidone carboxylic acid and also colored impurities. These are often extracted to some extent along with the desired acid and subsequently impede crystallization of the acid. We have found that the extraction mediums of the present invention are selective. They extract the above-mentioned impurities to such a limited extent that they do not impede crystallization of the desired acid. The result is that especially high yields of pure product can be obtained.

Thus, starting with an industrial citric acid solution obtained by fermenting molasses with a suitable mold mycelium and containing by weight 44.5% of soluble impurities and 55.5% of citric acid monohydrate, there can be obtained a final aqueous extract containing 92% by weight of citric acid monohydrate and 8% by weight of soluble impurities. The impurities are present in such a low proportion that they do not hinder the citric acid from crystallizing in high yield and in purity above 99%.

It is a further advantage of this invention that the mother liquors from the crystallization, which may still contain large amounts of the desired acid, can be returned to the original extraction step and fed for further processing. It is thus possible to effect complete separation of the impurities, together with crystallization of the desired acid.

The present invention also includes within its scope the novel products of the invention consisting of solutions of citric acid and itaconic acid in solvent systems comprising tri-n-butyl phosphate and a diluent or diluents. These are useful for the isolation of the organic acids contained in them in high yield and purity.

The following examples are given to illustrate the invention and it is to be understood that the invention is not to be considered as limited thereto except as indicated in the appended claims.

*Example 1*

Citric acid was extracted from an impure solution thereof produced by fermentation of a molasses solution by means of *Aspergillus niger*, said citric acid solution having been previously freed from the mycelium and the oxalic acid. The acid solution contained 90 grams of citric acid monohydrate per kg. of solution. The pH of the citric solution was adjusted to 1.7 by adding 10 grams of sulfuric acid per kg. of solution.

The solvent employed was a mixture of 9 volumes of tri-n-butyl phosphate and 1 volume of n-butyl ether.

In the annexed drawing, which represents the apparatus employed, E is the extraction device and CE is the counter-extraction or water-washing device. Each of these devices, which were operated continuously, exerted an extracting effect corresponding to 6 theoretical plates. Extractor E was maintained at a temperature of 30° C., and counter-extractor CE was maintained at 75° C.

By pipe 1 there was fed, per hour, 6.1 kg. of solution to be extracted, which was mixed in tank 3 with 0.8 kg. of mother liquor from the concentration and crystallization unit CC, the content of citric acid monohydrate in the mother liquor being 62.5% by weight. The mixture, representing 6.9 kg. per hour containing 15.2% of citric acid, was fed by pipe 5 to extractor E, and simultaneously 21 kg. of solvent were fed thereto by pipe 4. By pipe 6 were withdrawn per hour 5.9 kg. of waste water still containing 0.049 kg. of citric acid, and by pipe 7 22.08 kg. of extract containing 1 kg. of citric acid monohydrate.

The extract was fed by pipe 7 to counter-extractor CE which received also 8 kg. per hour of water by pipe 8. From CE were withdrawn, by pipe 4, 21 kg. of solvent which was returned to extractor E and, by pipe 9, 9.08 kg. of final aqueous extract containing 1 kg. of citric acid and 0.08 kg. of impurities. The final aqueous extract was treated with a decolorizing agent (activated carbon) and then sent to concentration and crystallization unit CC in which 0.5 kg. of citric acid monohydrate crystals were recovered (effluent 10) and from which a mother liquor containing 0.5 kg. of citric acid was recycled by pipe 2.

The citric acid crystals so obtained were pure enough to be used for most purposes without recrystallization.

*Example 2*

Itaconic acid was extracted from an impure solution thereof produced by fermenting a glucose solution by means of *Aspergillus terreus*, said itaconic acid solution having been previously freed from the mycelium.

The solvent employed was a mixture of 85 volumes of tri-n-butyl phosphate and 15 volumes of white spirit. The white spirit had a specific gravity of 0.782 and a distillation range of 140–195° C. at atmospheric pressure.

The apparatus was the same as in Example 1. Extractor E was maintained at a temperature of 25–30° C. and counter-extractor CE was maintained at 75° C.

By pipe 1 there was fed, per hour, 9.32 kg. of fermented solution containing 4.5% by weight of itaconic acid. The solution was mixed in tank 3 with 3 kg. of mother liquor from the concentration and crystallization unit CC, containing 0.24 kg. of itaconic acid. The mixture, representing 12.32 kg. per hour containing 0.66 kg. of itaconic acid, was fed by pipe 5 to extractor E, and simultaneously 6 kg. of solvent were fed by pipe 4. By pipe 6 there was withdrawn from extractor E 11.28 kg. of waste water containing 0.02 kg. of itaconic acid, and by pipe 7 there was withdrawn 6.84 kg. of extract containing 0.64 kg. of itaconic acid. The extract was fed by pipe 7 to the counter-extractor CE which simultaneously received 14.8 kg. of water by pipe 8. From counter-extractor CE there was withdrawn 6 kg. of solvent which was recycled by pipe 4 and 15.45 kg. of aqueous solution containing 4.17% by weight of itaconic acid, which was sent by pipe 9 to concentration and crystallization unit CC. The crystallization step gave, per hour, 0.4 kg. of itaconic acid crystals (effluent 10) and 3 kg. of mother liquor containing 80 grams of itaconic acid per liter and which was recycled to tank 3 by pipe 2.

Example 3

Citric acid was extracted from the same starting solution as in Example 1.

The solvent employed was a mixture of 4 volumes of tri-n-butyl phosphate and 1 volume of kerosene. The kerosene had a specific gravity of 0.773 and a distillation range of 110–240° C. at atmospheric pressure.

The extraction and counter-extraction were carried out as described in Example 1, except that by pipe 4 there was fed 24 kg. of solvent and by pipe 7 there was withdrawn 25.08 kg. of extract containing 1 kg. of citric acid (calculated as citric acid monohydrate) and 0.08 kg. of impurities. Concentration, crystallization and mother liquor recycling steps were carried out exactly as in Example 1, and the results were the same.

Example 4

Citric acid was extracted from the same starting solution as in Example 1.

The solvent employed was a mixture of 4 volumes of tri-n-butyl phosphate and 1 volume of methyl isobutyl ketone.

The operation was carried out exactly as described in Example 3 and the results were exactly the same.

Example 5

Itaconic acid was extracted from the same starting solution as in Example 2.

The solvent employed was a mixture of 8 volumes of tri-n-butyl phosphate, 1 volume of n-butyl acetate and 1 volume of n-butyl chloride.

The operation was carried out substantially as described in Example 2, and the results were the same.

Example 6

Citric acid was extracted from the same starting solution as in Example 1.

The solvent employed was a mixture of 4 volumes of tri-n-butyl phosphate and 1 volume of kerosene. The kerosene had a specific gravity of 0.730 and a distillation range of 110–160° C. at atmospheric pressure.

The operation was carried out exactly as described in Example 3 and the results were exactly the same.

Example 7

Itaconic acid was extracted from a starting solution analogous to that used in Example 2.

The solvent employed was a mixture of 85 volumes of tri-n-butyl phosphate and 15 volumes of 2-ethyl hexanol.

The operation was carried out as described in Example 2 and the results were substantially the same.

Example 8

Itaconic acid was extracted from the same starting solution as in Example 7.

The solvent employed was a mixture of 4 volumes of tri-n-butyl phosphate and 1 volume of n-amyl acetate.

The operation was carried out as described in Example 2, except that the counter-extraction step was performed at a temperature of 90° C. instead of 75° C. The results were substantially the same.

It should be emphasized that the process of the present invention may be applied not only to industrial solutions of citric acid and itaconic acid such as they are produced by fermentation, but as well to such industrial solutions which have been subjected to a previous concentration operation.

What is claimed is:

1. A process for extracting an organic acid selected from the group consisting of citric acid and itaconic acid from aqueous solutions thereof produced by fermentation which comprises extracting said solutions with a solvent consisting essentially of a mixture of tri-n-butyl phosphate and from about 5% to about 30% by volume with respect to the tri-n-butyl phosphate of at least one liquid diluent selected from the group consisting of white spirit, kerosene, n-butyl chloride, n-butyl ether, methyl isobutyl ketone, octyl alcohols and n-butyl, isobutyl, secondary butyl, amyl and isoamyl formate, acetate and butyrate esters.

2. A process as in claim 1 which further comprises extracting the resulting organic solution containing the acid with water to produce an aqueous solution of the desired acid.

3. A process for extracting citric acid from aqueous solutions thereof produced by fermentation which comprises extracting said solutions with a solvent consisting essentially of a mixture of tri-n-butyl phosphate and from about 5% to about 30% by volume with respect to the tri-n-butyl phosphate of at least one liquid diluent selected from the group consisting of white spirit, kerosene, n-butyl chloride, n-butyl ether, methyl isobutyl ketone, octyl alcohols and n-butyl, isobutyl, secondary butyl, amyl and isoamyl formate, acetate and butyrate esters.

4. A process for extracting itaconic acid from aqueous solutions thereof produced by fermentation which comprises extracting said solutions with a solvent consisting essentially of a mixture of tri-n-butyl phosphate and from about 5% to about 30% by volume with respect to the tri-n-butyl phosphate of at least one liquid diluent selected from the group consisting of white spirit, kerosene, n-butyl chloride, n-butyl ether, methyl isobutyl ketone, octyl alcohols and n-butyl, isobutyl, secondary butyl, amyl and isoamyl formate, acetate and butyrate esters.

5. A process for extracting an organic acid selected from the group consisting of citric and itaconic acid from aqueous solutions thereof produced by fermentation which comprises adjusting the pH of the aqueous solution to a value of from about 1.6 to about 1.8, extracting said solution with a solvent consisting essentially of a mixture of tri-n-butyl phosphate and from about 5% to about 30% by volume with respect to the tri-n-butyl phosphate of at least one liquid diluent selected from the group consisting of white spirit, kerosene, n-butyl chloride, n-butyl ether, methyl isobutyl ketone, octyl alcohols and n-butyl, isobutyl, secondary butyl, amyl and isoamyl formate, acetate and butyrate esters, at a temperature of from about 10° C. to about 30° C. and extracting the thus obtained organic solution with water at a temperature of from about 70° C. to about 90° C. to produce an aqueous solution of the desired acid.

References Cited by the Examiner

UNITED STATES PATENTS

| | | | |
|---|---|---|---|
| 2,107,527 | 2/38 | Evans et al. | 260—705 |
| 2,335,511 | 11/43 | Havemann et al. | 260—705 |

OTHER REFERENCES

Weissberger: "Separation and Purification," vol. III, 2nd ed., part I, p. 307 (1949).

LORRAINE A. WEINBERGER, *Acting Primary Examiner.*

CHARLES E. PARKER, LEON ZITVER, *Examiners.*

UNITED STATES PATENT OFFICE
CERTIFICATE OF CORRECTION

Patent No. 3,158,649                                      November 24, 1964

Pierre Colin et al.

It is hereby certified that error appears in the above numbered patent requiring correction and that the said Letters Patent should read as corrected below.

Column 3, TABLE II, heading to the second column thereof, for "14" read -- 15 --; column 6, line 53, for "90° C." read -- 95° C. --.

Signed and sealed this 27th day of April 1965.

(SEAL)
Attest:

ERNEST W. SWIDER                                   EDWARD J. BRENNER
Attesting Officer                                         Commissioner of Patents